US008027850B1

(12) United States Patent
Pietrzak

(10) Patent No.: US 8,027,850 B1
(45) Date of Patent: Sep. 27, 2011

(54) PROPERTY INSURANCE RISK ASSESSMENT PROCESSING SYSTEM AND METHOD

(75) Inventor: Steven J. Pietrzak, South Barrington, IL (US)

(73) Assignee: Millennium Information Services, Itasca, IL (US)

( * ) Notice: Subject to any disclaimer, the term of this patent is extended or adjusted under 35 U.S.C. 154(b) by 1110 days.

(21) Appl. No.: 11/287,649

(22) Filed: Nov. 28, 2005

(51) Int. Cl.
*G06Q 40/00* (2006.01)

(52) U.S. Cl. .......................................................... 705/4
(58) Field of Classification Search ........................ 705/4
See application file for complete search history.

(56) References Cited

U.S. PATENT DOCUMENTS

| | | | |
|---|---|---|---|
| 4,831,526 A * | 5/1989 | Luchs et al. ...................... 705/4 |
| 7,319,970 B1 * | 1/2008 | Simone ............................ 705/4 |
| 2003/0023462 A1 | 1/2003 | Heilizer | |
| 2003/0040934 A1 * | 2/2003 | Skidmore et al. ................. 705/1 |
| 2004/0024619 A1 * | 2/2004 | DiBella ............................ 705/4 |
| 2004/0153330 A1 | 8/2004 | Miller et al. | |
| 2005/0096944 A1 | 5/2005 | Ryan | |
| 2005/0209897 A1 | 9/2005 | Luhr | |
| 2006/0184440 A1 | 8/2006 | Britti et al. | |
| 2007/0088507 A1 | 4/2007 | Haberlen et al. | |

OTHER PUBLICATIONS

"Introducing Millennium's Automated Property System (MAPS™)," Millennium Information Services, Inc. (1995).
"Millennium's Automated Property System (MAPS™)," Millennium Information Services, Inc. (1998).
"Millennium's Automated Property System—e-MAPS™," Millennium Information Services, Inc. (2001).
"ITV—Boeckh and Millennium—Providing Successful Insurance-To-Value Solutions," Millennium Information Services, Inc. (1998).
"Boeckh and Millennium—Providing Successful Insurance-To-Value Solutions," Millennium Information Services, Inc., (1999).
Office Action for U.S. Appl. No. 12/394,777 dated Jan. 10, 2011.

* cited by examiner

*Primary Examiner* — Alexander Kalinowski
*Assistant Examiner* — Chuks Onyezia
(74) *Attorney, Agent, or Firm* — Marshall, Gerstein & Borun LLP

(57) ABSTRACT

Disclosed herein is a method of facilitating an insurance coverage determination for a property based on a plurality of characteristic elements relevant to the insurance coverage determination. The method includes receiving property data indicative of attributes of the property for the plurality of characteristic elements, determining a property risk score for the property based on the property data, and supporting the insurance coverage determination with the property risk score.

29 Claims, 4 Drawing Sheets

FIG. 3

PROPERTY INSURANCE RISK ASSESSMENT PROCESSING SYSTEM AND METHOD

BACKGROUND OF THE DISCLOSURE

1. Field of the Disclosure

Figure 1:
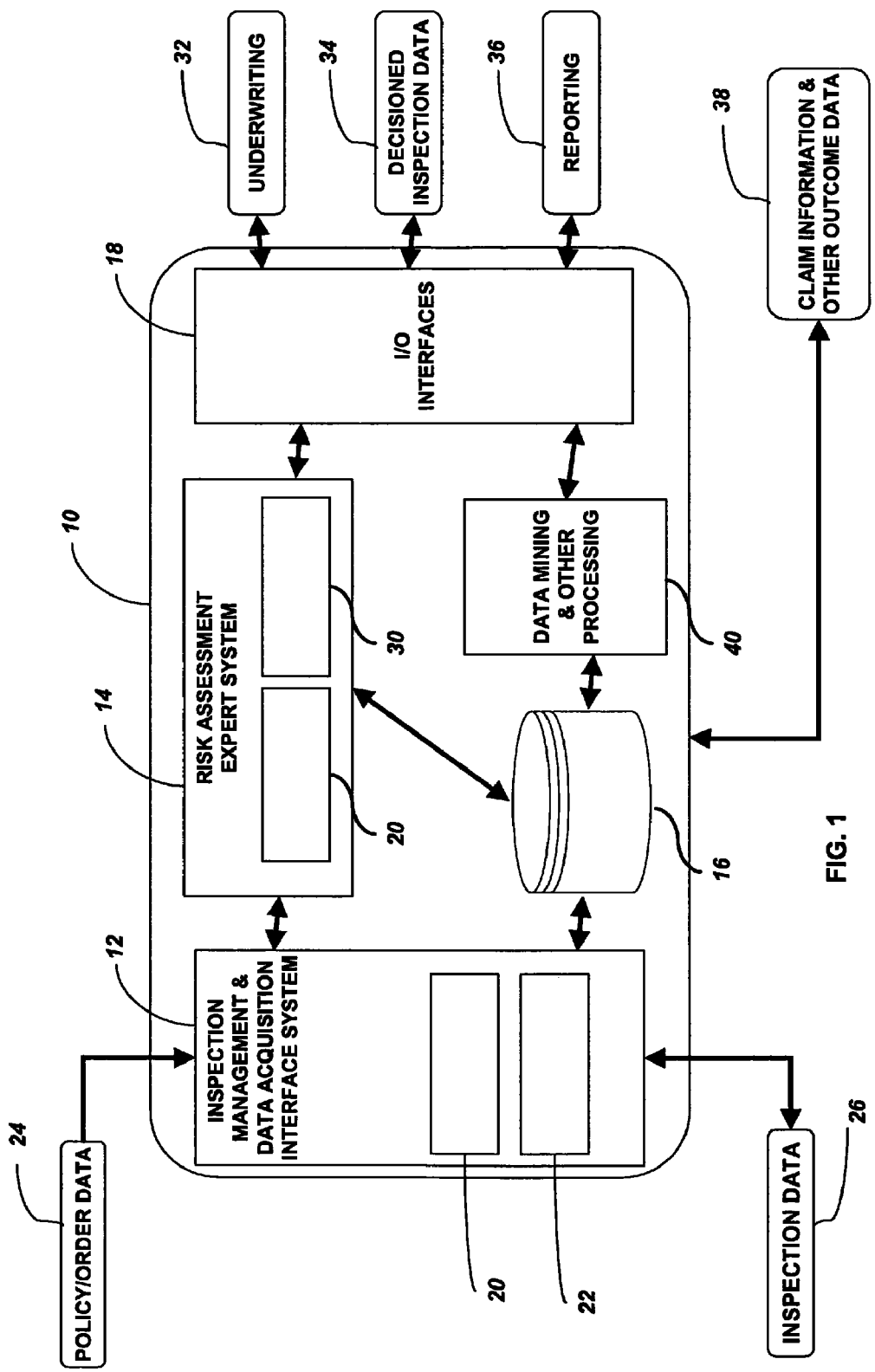

The disclosure relates generally to the processing of property insurance inspection data and, more particularly, to a system and method for processing such data with a risk assessment score.

2. Brief Description of Related Technology

A property inspection is one of a number of steps taken by an insurer considering whether to provide property insurance coverage to a property owner or policy applicant, i.e., the prospective insured. Property inspection reports, for instance, have long provided valuable information in the underwriting decision-making process.

Property inspections are typically performed by insurance agents or other designated individuals deployed in the field. Details collected about the property (e.g., the dwelling) are recorded on hardcopy or electronic forms designed to capture data related to a number of predetermined property characteristics. For instance, the inspector may utilize a number of checkboxes or placeholders on the form to identify attributes of the dwelling, such as the type of roof and siding.

Insurers have often outsourced the process of obtaining property inspections. For example, a commercially available service provided by the assignee of the present application (under the trademarks WIDE and MAPS) routes orders for property inspections in automated fashion to an appropriate individual (e.g., a local inspector) in the field. An inspection report is then generated in an automated fashion for electronic delivery to the insurer requesting the inspection. The service thus facilitates the front end, data gathering tasks, leaving most, if not all, of the analysis of the inspection data and information for the insurer. That is, such services generally did not directly assist the insurer in the processing of the inspection data and information.

One exception involves a replacement cost calculation that provides an estimated cost of rebuilding any structure in the event of a total loss of property. Replacement cost calculators, or calculation services, utilize one of many industry standard models, and are available from a number of providers, including Marshall & Swift, XactValue, and e2Value. In some cases, the cost estimate is provided to the insurer with the other inspection data and information. The calculation relies on certain data or information collected via the inspection. In any event, the manner in which the input data is provided to the calculator and the manner in which the resulting cost estimate are communicated have been automated by, or within, the above-described property inspection services. For example, the calculated estimate has been displayed as part of an inspection report provided to the insurer. The insurer then compares the estimate with a coverage level of the application or current policy to determine whether an underwriting referral should be generated. In some cases, the comparison has been conducted as part of the above-described property inspection services.

More recently, additional capabilities have been added to the inspection data collection process to assist the insurer in other ways. For example, functionality has been developed to provide convenient access to the inspection information and data. Specifically, the MAPS™ service made available by the assignee of the present application provides data integration capabilities so that insurers can download inspection data on-line and establish computer-to-computer data interfaces. Through such interfaces, an insurer analyzes the inspection data using database tools that support, for example, searching and sorting operations. In some cases, the inspection data has also been organized via a number of categories predetermined by the insurer. More specifically, such organization results in the placement of each inspected property (or the associated inspection report) in a category, or stack, according to criteria set by the insurer. For example, each policy renewal subject to a major condition (e.g., a rotting roof) may be placed in a separate category dedicated to those policy renewals requiring a letter to be sent to the insured to identify the repairs or corrections needed for renewal. While some rules previously set by the insurer have defined one or more categories based on an action to be taken by the insurer, other rules have been set to target a number of specific issues, such as the replacement cost estimate deviating from the policy coverage by more than 5%.

In either case, however, such inspection reporting services provide limited to no cumulative analysis of the inspection data and information. That is, the presence or absence of various issues, a simple binary decision repeated over all of the property characteristics, merely results in a number of flags for each property. The categorization or organization of each property into stacks based on any one of those flags fails to consider the cumulative effect of them all. Such limited analysis therefore leaves a considerable amount of risk assessment analysis to a non-automated, or manual, assessment of the inspection data at the insurer, which may lead to inconsistent or incorrect underwriting referrals or other incorrect insurance coverage determinations. Moreover, as insurers consider a greater number of characteristics in these determinations, the assessment of the cumulative effect of multiple flags, i.e., issues uncovered by the inspection, will be increasingly driven by subjective judgment calls prone to error and inconsistencies.

SUMMARY OF THE DISCLOSURE

In accordance with one aspect of the disclosure, a method is useful for facilitating an insurance coverage determination for a property based on a plurality of characteristic elements relevant to the insurance coverage determination. The method includes the steps of (i) receiving property data indicative of attributes of the property for the plurality of characteristic elements, (ii) determining a property risk score for the property based on the property data, and (iii) supporting the insurance coverage determination with the property risk score.

In some cases, the supporting step includes generating an interface that presents the property in one of a plurality of categories based on the property risk score. The supporting step may then further include utilizing a predetermined multiple-factor rule set that establishes the plurality of categories.

The insurance coverage determination may include a decision as to whether an insurance policy will be made available for the property.

The plurality of characteristic elements may include dwelling feature characteristics, dwelling condition characteristics, liability concern characteristics, and surrounding area characteristics. One of the liability concern characteristics may be directed to an owner risk characteristic. Alternatively or additionally, one of the liability concern characteristics is directed to a loss history for the property.

In some cases, the supporting step includes generating an underwriting referral for the property based on the property risk score.

The supporting step may include updating a database to reflect the property risk score for the property. The method may further then include the steps of receiving information regarding an outcome of the insurance coverage determination, and storing the outcome information in the database. The outcome information may reflect an insurance claim made for the property.

The insurance coverage determination may include a pricing decision for a policy for the property.

Alternatively or additionally, the insurance coverage determination includes a disposition decision for the property. The supporting step may then include the step of assigning a category to the property, the assigned category being indicative of the disposition decision.

The risk score determining step may include calculating an index that reflects a cumulative effect of the attributes of the property for the insurance coverage determination.

In accordance with another aspect of the disclosure, a computer program stored on a computer-readable medium is adapted for implementation by a processor in connection with an insurance coverage determination for a property based on a plurality of characteristic elements relevant to the insurance coverage determination. The computer program includes an input routine to collect property data indicative of attributes of the property for the plurality of characteristic elements, a processing routine to determine a property risk score for the property based on the property data, and an output routine to facilitate the insurance coverage determination with the property risk score.

The property risk score may include an index that reflects a cumulative effect of the attributes of the property for the insurance coverage determination.

The output routine may be configured to generate an underwriting referral for the property based on the property risk score.

In some cases, the computer program further includes a database management routine to update a database to reflect the property risk score for the property. The database management routine may then be configured to receive information regarding an outcome of the insurance coverage determination and store the outcome information in the database. The outcome information may reflect an insurance claim made for the property.

The insurance coverage determination may include a pricing decision for a policy for the property. Alternatively or additionally, the insurance coverage determination includes a disposition decision for the property.

In accordance with yet another aspect of the disclosure, a system facilitates an insurance coverage determination for a property based on a plurality of characteristic elements relevant to the insurance coverage determination. The system includes a processor, a database, and a database management routine adapted to be implemented by the processor to store in the database property data indicative of attributes of the property for the plurality of characteristic elements. The system further includes a risk score computation routine adapted to be implemented by the processor to process the property data to determine a property risk score for the property based on the property attributes. The database management routine is configured to store the property risk score in the database in association with the property data to support the insurance coverage determination for the property with the property risk score.

The property risk score may include an index that reflects a cumulative effect of the attributes of the property for the insurance coverage determination.

The output routine may be configured to generate an underwriting referral for the property based on the property risk score.

In some cases, the database management routine is configured to receive information regarding an outcome of the insurance coverage determination and store the outcome information in the database. The outcome information may reflect an insurance claim made for the property.

The insurance coverage determination may include a pricing decision for a policy for the property. Alternatively or additionally, the insurance coverage determination includes a disposition decision for the property.

BRIEF DESCRIPTION OF THE DRAWING FIGURES

Figure 2:
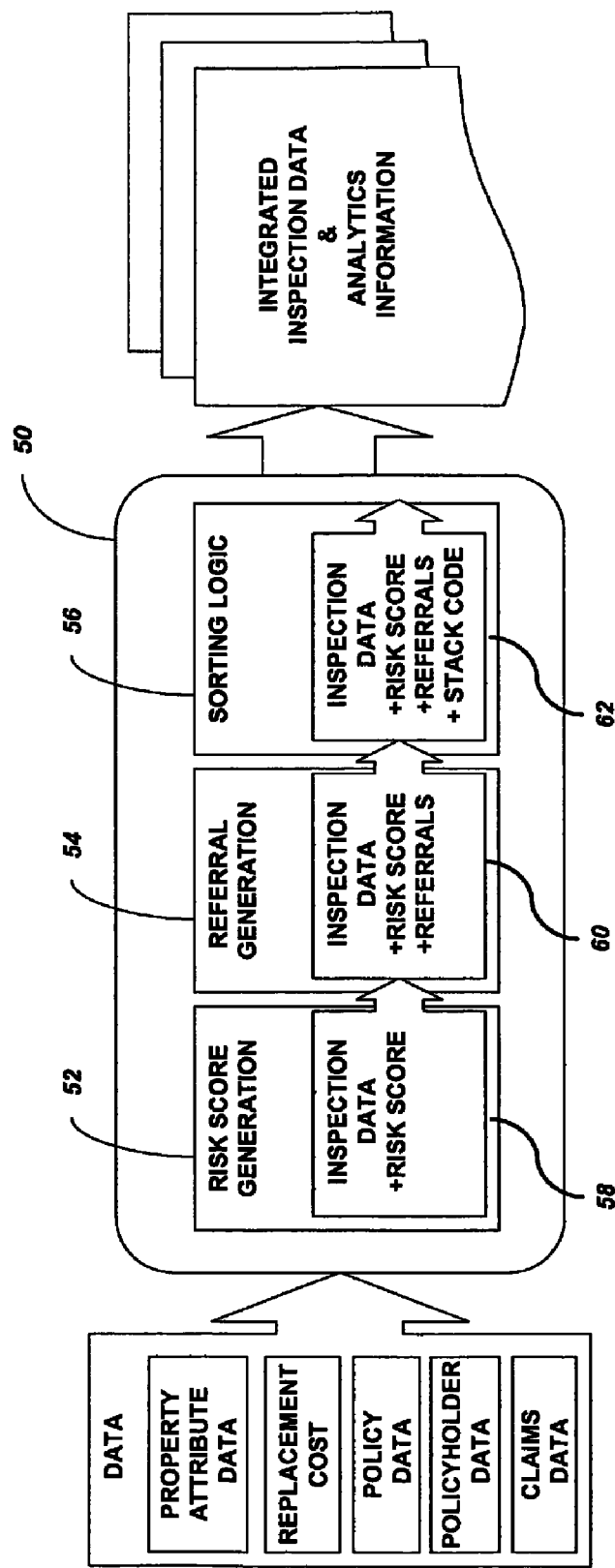
Figure 4:
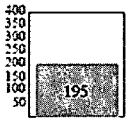

For a more complete understanding of the disclosure, reference should be made to the following detailed description and accompanying drawing figures, in which like reference numerals identify like elements in the figures, and in which:

FIG. 1 is a schematic diagram of a system for processing property inspection data to facilitate an insurance coverage determination in accordance with one aspect of the disclosure;

FIG. 2 is a schematic diagram depicting a method of processing property inspection data in accordance with another aspect of the disclosure, and which may be implemented by the system of FIG. 1 in accordance with one embodiment; and, FIG. 3 is an interface display generated by the system of FIG. 1 to present insurance coverage determination output information in accordance with an exemplary embodiment; and, FIG. 4 is an output report generated by the system of FIG. 1 to present insurance coverage determination output information in accordance with an exemplary embodiment.

While the disclosed system and method are susceptible of embodiments in various forms, there are illustrated in the drawing figures (and will hereafter be described) specific embodiments of the invention, with the understanding that the disclosure is intended to be illustrative, and is not intended to limit the invention to the specific embodiments described and illustrated herein.

DETAILED DESCRIPTION OF PREFERRED EMBODIMENTS

The disclosed system and method are generally related to helping insurers make more consistent insurance coverage determinations and decisions. As described below, such determinations may generally include decisions related to, for example, insurability, the need for underwriting, and policy pricing. The insurance coverage determinations are facilitated via an objective assessment of risk based on a number of factors, the underlying details for many of which are obtained via a property inspection. Generally speaking, the risk assessment incorporates analysis of the property inspection data and other information relevant to the coverage determination. In this way, the disclosed method and system provide a cumulative or aggregate assessment of the risk. More specifically, the risk assessment provides an objective evaluation of the inspection data and other relevant information via the calculation of a risk score or index for the property or policy.

While the disclosed system and method relies on the calculation of a risk score to facilitate consistent and accurate insurance coverage determinations, practice of the disclosed system and method is not limited to any one particular algorithm or algorithm type for computation of the risk score. Instead, and as further described below, any number of different formulas, computation routines or other algorithms may be utilized to aggregate the data and other information relevant to the insurance coverage determination. Similarly, practice of the disclosed technique is not limited to any particular property characteristics or attributes, and any set thereof may be relied upon given the specific application or context. Thus, the manner in which the effects of various property attributes are quantified, accumulated or otherwise represented in the calculation of the risk score may be adjusted or configured, as desired, for different situations, contexts, customer groups, geographic areas, property types (e.g., commercial vs. residential), and other desired factors.

The disclosed technique is well suited for use or application in connection with a broad range of insurance coverage determination contexts. The disclosed technique may be applied in connection with any property type, geographic area, etc., and is not limited to residential or other property types that may be more typically subjected to inspection, underwriting, or other analysis during the insurance coverage determination process. As a result, practice of the disclosed method and system is not limited to the homeowner's insurance context or the property inspection context, but rather is well suited for any context in which property or other relevant data and information has been collected or otherwise received for a plurality of characteristics related to a property, property insurance policy, or policy application, and where the nature and/or effect of such data and information in the aggregate may be quantified for aggregation or other processing.

The manner in which the disclosed risk assessment technique provides a scoring or indexing mechanism predictive or otherwise indicative of the propensity of the risk at the front end of an insurance determination is now described in connection with a number of exemplary embodiments. In accordance with another aspect of the disclosure, the manner in which the disclosed risk assessment technique is utilized at the back end of the insurance determination process is also described. Specifically, the disclosed technique may be utilized in combination with a database having the property risk score and other property attributes, data and information stored in association with performance data of the determination. Whether used at the front end or back end of the coverage determination, the embodiments described below may facilitate the insurer's use of property inspection and other data in any number of different insurance coverage decisions and other determinations.

With reference now to FIG. 1, an inspection data processing system 10 includes an inspection management and data acquisition interface system 12, a risk assessment expert system 14, a data warehouse 16, and any number of input/output (I/O) interfaces 18. These and other components of the system 10 may be integrated or distributed in any desired fashion, and are shown as separate systems (or sub-systems) for convenience in illustration only. For instance, both the systems 12 and 14, the data warehouse 16, and the I/O interface(s) 18 may be implemented on a single server or other computer having conventional processing, data storage and I/O interface capabilities. Furthermore, each of the systems 12 and 14 need not be integrated as shown, but rather may be implemented by more than one server or computer in any networked or otherwise distributed fashion.

The system 12 generally provides functionality related to the capturing or gathering of property inspection data. To that end, the system 12 may include a dedicated processor 20 and memory 22 for implementing one or more applications or routines that control the routing or other processing of inspection orders, the receipt of the inspection data and other information resulting therefrom, and any initial processing to prepare such data for analysis by the system 10. Accordingly, the system 12 may also have I/O capabilities (not shown) for interfacing via any desired communication mechanism, protocol, etc. with other systems 24, 26 from which policy data, inspection orders, and/or inspection data may be sent or acquired. In some embodiments, the I/O interface(s) 18 may be utilized to any desired extent to support such communications.

More generally, the system 12 implements an input routine to receive or collect the inspection and any other relevant data for each property (or policy). In some cases, the input routine may be stored in the memory 22 and adapted for implementation by the processor 20. In some embodiments, the input routine (and any other routines implemented by the system 12) may be integrated to any desired extent as a part of a database management application implemented by a database server.

For instance, in an exemplary embodiment, the management of inspection orders and the acquisition of inspection data provided by the inspection management and data acquisition interface system 12 is implemented with applications developed with standard Microsoft development tools and deployed in a windows-based environment with a commercially available and scalable database management system, such as Oracle or Microsoft SQL Server. In this way, the interface system 12 provides a relational database for the management of the data associated with inspection orders and data. Any hardware suitable for such database systems and applications may be utilized.

Generally speaking, the inspection data may be sent and received in any desired format or form. Practice of the disclosed technique is not limited, therefore, to any type of inspection data. Accordingly, as used herein, the terms "inspection data" and "property data" are used in a broad sense to include any information or data gathered in connection with, derived from, or otherwise acquired as a result of, a property insurance application or policy, regardless of the format, form, content or source of the information or data.

Generally speaking, the inspection or property data specify attributes of the property or aspects related thereto (e.g., the attributes of the policy, policyholder, owner, occupants, and/or applicant) for a number of characteristic elements of, or relevant to, the insurance coverage determination. Characteristic elements may include or be directed to, without limitation, any dwelling feature characteristics, dwelling condition characteristics, liability concern characteristics, and surrounding area characteristics. For example, one or more of the characteristic elements may be directed to the type and condition of the roof. In that case, two of the corresponding attributes for a particular property may then specify that the dwelling on the property has (i) a shingled roof (ii) in good condition. The property or inspection data provided to the system 12 may reflect those attributes in any desired fashion (e.g., via alphanumeric text, numerical codes, assigned data values, etc.). The system 12 may then process the incoming data from the systems 24, 26 to place such property data in a format suitable for further processing by the system 10.

In some embodiments, the insurer may elect (or be legally permitted) to consider the liability concern characteristics of the owner(s), occupant(s) or applicant(s) associated with the policy application or policy. In such cases, a credit score or other owner risk characteristic may be utilized or received. To that end, the system 12 may communicate or otherwise interface with one or more systems (not shown) to gather such data. Other liability concern characteristics may involve a loss history for the individual and/or the property.

Once the property data has been received, such data may be stored in the data warehouse 16 in association with the property (or policy) for future reporting and other uses. The data warehouse may include one or more databases or data structures of any desired configuration. The data warehouse 16 may also include one or more processors (not shown) implementing any desired database software (e.g., Oracle, SQL Server) for managing the data storage function. In one exemplary embodiment, the functionality provided by the data warehouse 16 is handled by an Oracle database server running in a Microsoft Server 2000 environment similar to the exemplary embodiment described above in connection with the interface system 12. In fact, this Oracle database server may, but need not, correspond with, or include, the database applications and systems provided for the interface system 12. Alternatively, the databases may run separately but on the same hardware.

The property data is also provided by the system 12 or the data warehouse 16 to the risk assessment expert system 14 for processing in accordance with the disclosed technique. As with the system 12, the risk assessment expert system 14 may be implemented via any desired configuration of hardware and software, but generally may include one or more processors 28 and one or more memories 30 dedicated thereto. As described in greater detail below, the system 14 processes the property data to determine a property risk score (e.g., index) for the property. Generally speaking, the calculation, computation or other determination of the risk score provides a collective or cumulative assessment of the property in the sense that property data indicative of the attributes for a number of characteristic elements are processed to arrive at the risk score. The risk score then represents the combined effects of all the attributes. In this way, the risk score may be considered an index, but should not be limited to any particular computation algorithm or scheme. For instance, the risk score may, but need not, provide an indexed view of the property attributes via weighted contributions to a summed total. In such cases, the contributions, the weights, and the summing algorithm may be configured in any desired manner, and may be customized for the context (e.g., property type) to which the risk score is being applied.

More generally, the calculation, computation or other determination of the risk score based on the property data may utilize any algorithm or algorithm type. For instance, the weighted-sum score or index described above may be combined or replaced with other statistical analytics, such as a behavior probability model. In such models, the score may quantify the probability that the owner(s), applicant(s) and/or occupant(s) are likely to utilize and/or maintain the property in a manner unlikely (or, conversely, likely) to result in a claim. For example, if the components of the house are more valuable than the value of the house itself, one may consider that an indication of a higher claim probability. Conversely, if the replacement cost of the property is less than the market value, then the owner would presumably take steps to maintain and protect the property, leading to a lower claim probability.

In some embodiments, the risk score is stored in the data warehouse 16 in association with the property data from which it was determined. In this way, the risk score may become a component of a comprehensive report provided to the insurer regarding the property. As a result, and as described in greater detail below, the report provides both the raw inspection data and other relevant information for the policy application or renewal, but also an objective analysis thereof to support consistent and accurate decision-making by the insurer. The risk score thereby facilitates the proper disposition of policy applications and renewals, and any intermediate or other insurance coverage determinations related thereto (e.g., underwriting referrals).

More generally, the storage and/or transmission of the risk score may be handled by an output routine implemented by any one or more of the processors noted above (e.g., the processor 28 of the system 14). To that end, the output routine may be stored in any one or more of the memories associated or in communication with such processor(s), and/or be integrated as a part of the above-described database management application(s). As described immediately above, the output routine may store the risk score in the data warehouse 16 or in any other database. Alternatively or additionally, the output routine may provide the risk score to the insurer or some other database or memory in communication with the system 10. To that end, the output routine may be implemented as a part of the I/O interface(s) 18.

With continued reference to FIG. 1, the manner in which the insurance coverage determinations are supported is shown generally via interaction between the system 10 and various systems having functionality that may, but need not, be provided by the insurer. Specifically, in the exemplary embodiment shown, the system 10 may provide an underwriting referral to a system 32 directed to processing the referrals. The communication may, but need not, be bi-directional, in the sense that the system 32 may provide information or data back to the system 10 to indicate the status or results of the underwriting analysis.

In some embodiments, an additional system 34 may communicate with the system 10 to relay information or data indicative of the insurance coverage determination supported by the risk assessment processing (e.g., the risk score) of the disclosed technique. In some cases, however, the underwriting system 32 and the system 34 constitute the same system, and may serve as the main interface with the insurer. In any case, the system 34 (or 32) may receive the property data (including the risk score) in association with information indicating whether a certain action should be (or has been) taken as a result of the risk assessment.

Any number of actions may be taken that, generally speaking, involve a disposition of the policy application or renewal. Exemplary dispositions include whether a policy will be made available or renewed, and in the event of an affirmative outcome, a pricing tier decision. Each of these determinations, or disposition decisions, may be represented by a stack or category dedicated thereto, and assigned to the property or policy after the risk score and other property data is determined, as described below.

Information regarding the outcome of the disposition may flow back to the system 10 as well. Assume, for example, that the insurer has predetermined that coverage will be denied if the risk score falls below a threshold or level. When the requisite level is not met, the system 10 may notify the system 34 (or other component or system of the insurer) that a denial notification letter should be sent to the applicant or policyholder. Once the letter is sent, an indication of its delivery may be returned to the system 10 for storage in the data warehouse 16. In this way, a comprehensive record of the property inspection process is maintained by the system 10.

Other outcome information that may flow back to the system 10 includes information or data reflective of insurance claims made in connection with the property or policy.

In many cases, the insurer maintains its own records of the property inspection process. The records may be utilized during the underwriting process or at any other point before, during or after the disposition of the policy application or renewal. In any event, the system 10 may generally provide one or more reports to support the insurance coverage determination. As shown and described below in connection with FIG. 4, the report may include a summary of the inspection along with the property risk score. Therefore, in some embodiments, the insurer (or other entity) may have a system 36 directed to utilizing and/or storing the reports as a part of the insurance coverage determination process. Alternatively or additionally, the insurer may have a system 38 dedicated to storing information and data indicative of the results or outcomes of the inspection process. Reports generated by the system 10 may, but need not, be handled separately.

The reports may be customized in accordance with any desired factor and may, for example, be generated as a result of a request sent by the system 36. In such cases, the system 36 may specify the desired nature, format or other aspect of the report. For instance, the system 36 may specify one or more parameters or other factors identifying a group of policies or properties to be included in a report. Upon receipt of the request, the system 10 may then direct a database management application or module 40 to implement data mining and other processing to retrieve the requested information from the data warehouse 16. The report itself may be generated by the application 40 or any other software resident in any of the components of the system 10. In some cases, the functionality provided by the database application 40 may be implemented by, or incorporated or integrated in, one of the other components of the system 10.

Alternatively, some of the functionality implemented by the systems 32, 34, 36 and 38 may be provided by the system 10, as desired. In some cases, the functionality may be provided in an automated fashion given rule sets established previously by the insurer. For instance, the underwriting referral and other control or management of the underwriting process may be initiated or otherwise managed by the system 10. In such cases, one or more predetermined triggers may be established. But rather than having to rely on individual elements of the raw inspection data (or the replacement cost value), practice of the disclosed technique enables the triggers to utilize, include or incorporate the collective or cumulative risk assessment provided by the risk score.

Alternatively or additionally, the initiation of any actions necessary to address a condition for policy renewal may be handled in automated fashion by the system 10. Similarly, the generation of reports may be automatic based on predetermined criteria, rule sets or any other factor, including the mere generation of the risk score itself.

Regardless of whether the insurer has delegated the management or implementation of underwriting referrals or report generation, the communication of data between the systems 32, 34, 36, and 38 and the system 10 may be automated such that the data warehouse 16 is automatically updated to reflect the results of an underwriting referral or other outcome of the policy disposition, such as a pricing tier decision. As shown in connection with the system 38, such communication is not necessarily limited to the inspection process or, for that matter, the activities directly related to the policy disposition. Rather, information or data indicative of future events, such as claims information or any other events affecting the profitability of the policy, may be provided, stored or otherwise associated with the property data and/or the risk score. Claims information and other outcome data may then be used to evaluate the performance of various stages in the inspection process, including, for instance, underwriting and the risk score (or the algorithm leading thereto).

With reference now to FIG. 2, further details are provided regarding the processing and other routines in accordance with an exemplary embodiment that may, but need not, be implemented using the system 10 (FIG. 1) and other elements described in connection therewith. That is, FIG. 2 shows the data flow and processing implemented in accordance with those embodiments of the disclosure implemented largely or entirely via software executed by one or more general-purpose processors. Such software may, but need not, be implemented as (or in connection with) integrated modules or other portions of a database management software application or application suite. Notwithstanding the foregoing, the functionality shown in FIG. 2 may be implemented via the processors and other components described above in connection with FIG. 1 executing one or more software applications, modules, or other computer programs or methods.

In the exemplary embodiment of FIG. 2, the generation of the risk score, the generation of any underwriting or other referrals, and the execution of any sorting or other organizational routines, are generally implemented via the execution of a routine (or application) 50, which may be a processing routine integrated or in communication with the above-described database management application(s). The routine 50, in turn, includes a number of modules configured to implement one or more sub-routines dedicated to specific data generation functions. Specifically, a risk score generation routine 52, a referral generation routine 54, and a stack code generation (or sorting logic) routine 56 may be implemented automatically or conditionally in response to the nature of the incoming property data, as described below. For convenience in illustration, the routines 52, 54 and 56 are depicted along with blocks 58, 60, and 62, respectively representative of the dataflow through the implementation of the block 50. As the data and information from the inspection is processed by the block 50, the data is associated or integrated with a risk score, one or more underwriting referrals, and one or more stack or other organizational codes (as described below). In this way, the property data is processed to include additional data and information to facilitate the insurance coverage determination in a more effective manner than the raw inspection data would support alone.

In this embodiment, the raw inspection data may include policy attribute data, replacement cost estimates, policy information or data, policyholder (i.e., owner) data, and claims data. As described above, some of the data may be provided after the inspection process has resulted in a policy renewal, such as information regarding a subsequent claim. Such data may be incorporated into the risk score calculation, as desired. Accordingly, the risk score for a particular property may be updated to reflect changes to the property or other factors that may influence further decisions in the future.

The results of the implementation of the routine 50 generally include integrated inspection data and analytics information, as shown in FIG. 2. The nature of the integration may be reflective of the content of a report and/or the nature of the database in which the integrated data and information is stored. In either case, the integrated nature of the data assists the insurer in its analysis or handling of the results of the property inspection.

The generation of stack codes via the routine 56 may rely on the risk score determined by the routine 52. That is, rather than rely on sorting logic that looks at one or two of the property attributes individually to determine whether the policy falls in various stacks or categories, the insurer may utilize the risk score to organize or sort the policies into stacks that take into account the cumulative effect of all of the property attributes. In any event, the generation of the stack codes may utilize a predetermined, multiple-factor rule set that establishes the plurality of stacks, or categories, in accordance with the insurer's preferences.

Referring now to FIG. 3, the above-described output routine, database management application, or any module or other portion thereof may be configured to generate one or more client access interface display screens. An exemplary client access display screen 70 provides an inspection status panel 72, a command or menu panel 74, and a sort function panel 76. Generally speaking, the interface(s) provided by display screens like the exemplary screen 70 allows an insurer to review the results and related referrals, stack logic code and risk score for inspections completed during defined time periods. In this case, the status panel 72 provides a listing of inspection results that present data specific to each of the inspections and related policies. The list may be sorted using the sort function panel 76 by any number (e.g., up to three) of the property characteristics identified in the column headers. Specifically, the sort function panel 76 provides a number of drop-down menus with corresponding check or selection boxes to configure the sorting routine. The display screen 70 may also support further access and display of inspection or property data by allowing the insurer to select a specific policy or property via, e.g., a mouse-click selection anywhere within the specific row. In that event, a further display screen (not shown) may be generated to allow the insurer to view the detailed inspection results and any other data not necessarily displayed via the characteristics shown in the display screen 70.

As part of the property data made available to the insurer, the risk score is displayed for each policy or property (in this case, the column farthest to the right). The stack codes may also have one or more dedicated columns.

The display screen 70 generally allows the underwriters to sort inspection results, typically by one or more of the stack codes, to support identifying specific inspections requiring further review for disposition. That is, the underwriters will identify those inspections having referrals and specific conditions of the property, thereby requiring the judgment of an underwriter for disposition. Inspections codified with acceptable stack codes need not be reviewed by underwriters and, thus, the utilization of the stack codes allows underwriters to review only a fraction of all inspections performed.

The display screen 70 and any display screens accessible therefrom may also allow the underwriters to apply a disposition code to the inspections. Examples of such codes may include, but are not limited to, "Issue-Renew", "Issue Condition Letter", and "Cancel-Do Not Renew." In this exemplary case, the display screen 70 includes a "Disp. Code" column. These disposition codes are then integrated back into the policy underwriting systems to effect the defined disposition, and may also be stored in the data warehouse 16 or other memory associated with the system 10.

Menu items in the panel 74 generally provide users access to other functionality and reporting such as the manual ordering of inspections, reports for monitoring inspection and quality review throughput and timeliness, and other administrative tasks.

FIG. 4 depicts an exemplary property report generated in accordance with one embodiment of the disclosed system and method. The report may be generated on-line for display via, e.g., an interface display screen, or otherwise transmitted to a user. Alternatively or additionally, the report may be ordered or otherwise requested via such interfaces for delivery in hardcopy form. In any case, the exemplary report includes sections dedicated to summarizing the salient portions of the property inspection, the calculation of a replacement cost, and the calculation of the risk score. In this case, the risk score is shown by a single quantity, but this need not be the case. That is, the risk score may be quantified with multiple values, each of which may, for instance, be dedicated to certain portions of the analysis. The risk score section of the report also shows a number of factors that heavily influenced the risk score value. Lastly, the report includes a section listing the underwriting referrals that were generated as a result of the risk score value and other property data.

Both the display screen 70 (FIG. 3) and the property report of FIG. 4 may be generated by the above-described output routine or another routine implemented by or associated with the system 14, data warehouse 16, or the I/O interface 18, such as a database management application or application suite or module thereof.

As described above, the determination of a risk score or index that aggregates the effects of a number of property attributes improves the risk assessment and other aspects of insurance coverage decisions and other determinations. To that end, the risk score may be utilized to sort and identify policies or groups thereof, may be utilized to define stacks or categories of such policies, or may be used directly in policy disposition logic (i.e., rule sets) by the insurer. In these ways, the insurer increases the consistency and accuracy of its coverage determinations and actions to support better risk assessment in property insurance policies. In these ways, the numerical nature of the risk score objectively correlates the property attributes that may have, for instance, been identified as risk characteristics and maintenance behavior in an inspection report, with loss ratio performance.

Embodiments of the disclosed system and method may be implemented in hardware, software, firmware, or any combination thereof. Some embodiments may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has one or more processors, such as, for example, a general-purpose processor, a CPU, a digital signal processor (DSP), a microcontroller, an application specific integrated circuit (ASIC), or a microprocessor.

The programs may be implemented in a high-level procedural or object oriented programming language to communicate with a processing system. The programs may also be implemented in assembly or machine language, if desired. In fact, practice of the disclosed system and method is not limited to any particular programming language. In any case, the language may be a compiled or interpreted language.

The programs may be stored on a storage media or device (e.g., floppy disk drive, read only memory (ROM), CD-ROM device, flash memory device, digital versatile disk (DVD), or other storage device) readable by a general or special purpose programmable processing system, for, configuring and operating the processing system when the storage media or device is read by the processing system to perform the procedures described herein. Embodiments of the disclosed system and method may also be considered to be implemented as a machine-readable storage medium, configured for use with a processing system, where the storage medium so configured causes the processing system to operate in a specific and predefined manner to perform the functions described herein.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A computing device comprising:
a processor;
a memory; and
an insurance coverage routine maintained in the memory and including a plurality of sub-routines each including a plurality of instructions executed on the processor to determine an insurance coverage policy for a property based on a plurality of characteristic elements of the property that are relevant to a disposition of the insurance coverage policy, the plurality of characteristic elements including a property characteristic and an attribute identified as a risk characteristic, the plurality of sub-routines including:
a risk score generation sub-routine including instructions for:
receiving a plurality of property data sets, each set obtained via a physical inspection of the property, conducted by an inspector other than an owner of the property, and including the plurality of characteristic elements;
determining a property risk score for each received property data set using an algorithm, the algorithm including an input of the plurality of characteristic elements, and the property risk score including an assessment of risk for a future insurance claim on the property under the insurance coverage policy; and
a stack code generation sub-routine including instructions for:
receiving the determined property risk score for each received property data set;
receiving a multiple-factor rule set including an insurer preference for the disposition of the insurance coverage policy based on the risk score; and
organizing each of the plurality of property data sets into at least one of a plurality of stacks based on a comparison of the property risk score and the multiple-factor rule set;
wherein a first rule of the multiple-factor rule set indicates that a property risk score below a threshold property risk score organizes the data set into a first stack for denial or further review of the insurance coverage policy, and a second rule of the multiple-factor rule set indicates that a property risk score above the threshold property risk score organizes the data set into a second stack for issue or renewal of the insurance coverage policy.

2. The computing device of claim 1, further comprising an instruction for generating an interface that presents displays the property data in one of the plurality of categories based on the property risk score.

3. The computing device of claim 1, wherein a multiple-factor rule set establishes the plurality of categories.

4. The computing device of claim 1, further comprising an instruction for determining whether an insurance policy will be made available for the property based on the property risk score.

5. The computing device of claim 1, wherein the property characteristic includes dwelling feature characteristics, dwelling condition characteristics, and surrounding area characteristics.

6. The computing device of claim 1, wherein the input of the algorithm includes an owner credit score.

7. The computing device of claim 6, wherein the risk characteristic includes a loss history for the property.

8. The computing device of claim 2, wherein the generating instruction comprises generating an underwriting referral for the property based on the property risk score.

9. The computing device of claim 2, wherein the generating instruction comprises updating a database to reflect the property risk score for the property.

10. The computing device of claim 9, further comprising instructions for receiving information regarding an outcome of the insurance coverage determination, and storing the outcome information in the database.

11. The computing device of claim 10, wherein the outcome information reflects an insurance claim made for the property.

12. The computing device of claim 1, wherein the insurance coverage determination comprises a pricing decision for a policy for the property.

13. The computing device of claim 2, wherein the insurance coverage determination comprises a disposition decision for the property.

14. The computing device of claim 13, wherein the generating instruction comprises assigning a category to the property.

15. The computing device of claim 1, wherein the risk score determining instruction comprises calculating an index that reflects a cumulative effect of the attributes of the property for the insurance coverage determination.

16. A computer program stored on a non-transitory computer-readable medium and adapted for implementation by a processor in connection with an insurance coverage policy for a property based on a plurality of characteristic elements relevant to a disposition of the insurance coverage policy, the computer program comprising:
an input routine to collect a plurality of property data sets, each set obtained via a physical inspection of the property, conducted by a person other than an owner of the property, and including attributes of the property for the plurality of characteristic elements, the attributes including one or more of a property characteristic and an attribute identified as a risk characteristic;
a processing routine to determine a property risk score for each received property data set using an algorithm, the algorithm including an input of the attributes of the property for the plurality of characteristic elements, and the property risk score including an assessment of risk for a future insurance claim on the property under the insurance coverage policy;
a sorting logic routine to:
receive the determined property risk score for each received property data set;
receive a multiple-factor rule set including an insurer preference for the disposition of the insurance coverage policy based on the risk score;

organize each of the plurality of property data sets into at least one of a plurality of categories based on a comparison of the property risk score and the multiple-factor rule set;

wherein a first rule of the multiple-factor rule set indicates that a property risk score below a threshold property risk score organizes the data set into a first stack for denial or further review of the insurance coverage policy and a second rule of the multiple-factor rule set indicates that a property risk score above the threshold property risk score organizes the data set into a second stack for issue or renewal of the insurance coverage policy; and an output routine to display the property risk score and the sorted plurality of property data sets.

17. The computer program of claim 16, wherein the property risk score comprises an index that reflects a cumulative effect of the attributes of the property for the disposition of the insurance coverage policy.

18. The computer program of claim 16, wherein the output routine is configured to generate an underwriting referral for the property based on the property risk score.

19. The computer program of claim 16, further comprising a database management routine to update a database to reflect the property risk score for the property.

20. The computer program of claim 19, wherein the database management routine is configured to receive information regarding an outcome of the disposition of the insurance coverage policy and store the outcome information in the database.

21. The computer program of claim 20, wherein the outcome information reflects an insurance claim made for the property.

22. The computer program of claim 16, wherein the disposition of the insurance coverage policy comprises a pricing decision for a policy for the property.

23. A system to facilitate an disposition of the insurance coverage policy for a property based on a plurality of characteristic elements relevant to the disposition of the insurance coverage policy, the system comprising:

a processor;

a memory;

a database management routine stored in the memory and adapted to be implemented by the processor to store in a database a plurality of property data sets each set obtained via a physical inspection of the property conducted by a person other than an owner of the property, and including attributes of the property for the plurality of characteristic elements, the attributes including one or more of a property characteristic and an attribute identified as a risk characteristic;

a risk score computation routine stored in the memory and adapted to be implemented by the processor to process the property data sets to determine a property risk score for each received property data set based on the attributes of the property for the plurality of characteristic elements and the property risk score including an assessment of risk for a future insurance claim on the property under the insurance coverage policy; and a sorting logic routine stored in the memory and adapted to be implemented by the processor to:

organize each of the plurality of property data sets into at least one of a plurality of categories;

wherein if a property risk score is below a threshold property risk score, the sorting logic routine organizes the data set into a first stack for denial or further review of the insurance coverage policy and if a property risk score is above the threshold property risk score, the sorting logic routine organizes the data set into a second stack for issue or renewal of the insurance coverage policy;

wherein the database management routine is configured to store the property risk score in the database in association with each organized property data set to support the disposition of the insurance coverage policy for the property.

24. The system of claim 23, wherein the property risk score comprises an index that reflects a cumulative effect of the attributes of the property for the disposition of the insurance coverage policy.

25. The system of claim 23, wherein the sorting logic routine is configured to generate an underwriting referral for the property based on the property risk score.

26. The system of claim 23, wherein the database management routine is configured to receive information regarding an outcome of the disposition of the insurance coverage policy and store the outcome information in the database.

27. The system of claim 26, wherein the outcome information reflects an insurance claim made for the property.

28. The system of claim 23, wherein the disposition of the insurance coverage policy comprises a pricing decision for a policy for the property.

29. The computer program of claim 23, further comprising an input routine to receive the disposition decision.

* * * * *